(12) United States Patent
Lemmers (10) Patent No.: US 8,326,133 B2
(45) Date of Patent: Dec. 4, 2012

(54) METHOD AND DEVICE FOR PROVIDING MULTIPLE VIDEO PICTURES

(75) Inventor: Johannes Hendrikus Maria Lemmers, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1046 days.

(21) Appl. No.: 11/909,468

(22) PCT Filed: Mar. 15, 2006

(86) PCT No.: PCT/IB2006/050813
§ 371 (c)(1),
(2), (4) Date: Sep. 24, 2007

(87) PCT Pub. No.: WO2006/103578
PCT Pub. Date: Oct. 5, 2006

(65) Prior Publication Data
US 2010/0141833 A1      Jun. 10, 2010

(30) Foreign Application Priority Data
Mar. 29, 2005   (EP) .................................. 05102455

(51) Int. Cl.
*H04N 7/00*       (2011.01)
*H04N 5/45*       (2011.01)
*H04L 12/66*      (2006.01)
(52) U.S. Cl. ......... 386/341; 348/468; 348/474; 370/352
(58) Field of Classification Search ............. 386/46, 386/125, 230, 357, 105, 219, 246, 328, 329, 386/355, 356; 715/716; 348/13, 564, 10; 725/139, 134, 142, 37
See application file for complete search history.

(56) References Cited

U.S. PATENT DOCUMENTS

| | | | |
|---|---|---|---|
| 5,237,426 A | 8/1993 | Daito | |
| 5,774,172 A | 6/1998 | Kapell et al. | |
| 5,784,528 A * | 7/1998 | Yamane et al. | 386/329 |
| 6,415,101 B1 | 7/2002 | deCarmo et al. | |
| 6,757,707 B1 * | 6/2004 | Houghton et al. | 709/203 |
| 7,757,252 B1 * | 7/2010 | Agasse | 725/41 |
| 7,787,439 B1 * | 8/2010 | Oz et al. | 370/352 |
| 7,792,012 B2 * | 9/2010 | Yahata et al. | 369/272.1 |
| 2001/0056577 A1 * | 12/2001 | Gordon et al. | 725/52 |
| 2002/0067376 A1 * | 6/2002 | Martin et al. | 345/810 |
| 2003/0090504 A1 | 5/2003 | Brook et al. | |

(Continued)

FOREIGN PATENT DOCUMENTS

JP       3224379 A       10/1991

(Continued)

*Primary Examiner* — Thai Tran
*Assistant Examiner* — Sunghyoun Park (57) ABSTRACT

An optical disc (2) contains at least one title comprising a collection of mosaic video data (22) which, on reading and suitable processing by a disc drive (3), result in a mosaic of multiple scenes (41, 42, 43, 44) in different sections (31, 32, 33, 34) of a display screen (4). The title further contains data (21) representing a machine-executable application for the disc drive (3) causing the disc drive (3) to generate a graphics layer overlying said mosaic of multiple scenes. Said graphics layer comprises a first portion which is at least partly transparent and which is aligned with one of said sections (31, 32, 33, 34) of the display screen (4); and said graphics layer comprises a second portion which is fully opaque and which is aligned with all other sections of the display screen (4).

28 Claims, 6 Drawing Sheets

U.S. PATENT DOCUMENTS

| | | |
|---|---|---|
| 2003/0110505 A1* | 6/2003 | De Vos et al. .................. 725/93 |
| 2003/0113096 A1 | 6/2003 | Taira et al. |
| 2004/0128317 A1 | 7/2004 | Sull et al. |
| 2006/0107294 A1* | 5/2006 | Rivlin et al. .................... 725/80 |
| 2006/0282852 A1* | 12/2006 | Purpura et al. ................. 725/39 |

FOREIGN PATENT DOCUMENTS

| | | |
|---|---|---|
| JP | 5083666 A | 4/1993 |
| JP | 8289218 A | 11/1996 |
| JP | 2000358207 A | 12/2000 |
| JP | 2004199188 A | 7/2004 |
| WO | WO9830025 A2 | 7/1998 |
| WO | WO0022819 A1 | 4/2000 |
| WO | WO03096682 A1 | 11/2003 |

* cited by examiner

METHOD AND DEVICE FOR PROVIDING MULTIPLE VIDEO PICTURES

FIELD OF THE INVENTION

The present invention relates in general to a method for providing multiple video pictures in an efficient manner, such that a user can choose which picture to watch. The invention relates to providing the plurality of pictures stored on a storage medium as well as providing the plurality of pictures by way of data transmission.

BACKGROUND OF THE INVENTION

A television screen is defined by a large number of image points or pixels. To display a still picture, data needs to be provided to determine the color and intensity of all these pixels. To display a moving picture or movie, such data needs to be provided for a succession of individual still pictures. According to European standards, a video movie contains 25 pictures per second. Thus, displaying a video movie involves a data stream of many megabits per second.

It is noted that, in order to reduce this data stream, it is known to compress the data; depending on the compression technique employed, the inevitable loss of information leads to no or an acceptable degradation of image quality. Nevertheless, it should be clear that a video movie of a certain defined length of time corresponds to a certain amount of data. In transfer, such as broadcast by air or transmission over a network, or from a disc drive to a display, the movie involves a data stream of a certain bit frequency or bandwidth. In storage on a storage medium, such as for instance a hard disc, an optical disc etc., the storage capacity of the storage medium defines a limit to the length of a video stream that can be stored.

There is a tendency towards interactive television, a concept which allows a user to influence the movie he is watching. In one approach, the user is offered a plurality of movies, and the user's influence actually corresponds to a selection of one movie out of the plurality offered. Defined in this way, even the conventional system of a plurality of television channels can be indicated as being "interactive", since the user has to press a button to make a choice. Actually, this conventional system is illustrative for the conventional way a plurality of movies is made available to a user: the full data of all video streams are provided in parallel. Thus, providing a plurality of N movies takes a bandwidth of N times the bandwidth of one single movie. Likewise, if a storage medium contains N movies stored in a traditional manner, the full data of all video streams being stored, the lengths of the individual movies are reduced by a factor N (assuming all movies have equal length).

Although the present invention is applicable to a situation where a plurality of "different" movies are provided, the present invention relates particularly to a multi-angle or multi-version movie. For instance, a scene is filmed from four different view points or angles, giving in fact four different movies relating to the same scene. When this is offered to a user, the user can choose an angle, and during display he can switch from one angle to another.

As mentioned, in a conventional approach all angles or movie versions are provided in parallel as complete movies. This involves a multiplication of the required bandwidth. Further, a problem is to ensure synchronization between the individual pictures: if a user switches from one angle to another, the local time of the scene must continue undisturbed.

It is an objective of the present invention to overcome or at least reduce the above problems.

SUMMARY OF THE INVENTION

According to an important aspect of the present invention, the individual pictures are combined to one video stream which, on display, results in a mosaic of the individual pictures. Since mosaic display is known per se, this need not be explained in further detail here. It is noted that this requires the bandwidth of one video stream only.

According to a further important aspect of the present invention, a display control application is provided in association with the mosaic video stream. Typically, this display control application will be transmitted first, prior to the transmission of the actual multi-angle or multi-version video stream.

According to a further important aspect of the present invention, the display control application is designed to display a graphics overlay over the mosaic video. This graphics overlay is fully opaque, except for one rectangle. In response to receiving a user command, the location of the rectangle is set so as to correspond to one tile of the mosaic movie. Thus, one of the individual movies is displayed while all other movies are hidden.

BRIEF DESCRIPTION OF THE DRAWINGS

These and other aspects, features and advantages of the present invention will be further explained by the following description of a preferred embodiment with reference to the drawings, in which same reference numerals indicate same or similar parts, and in which.

DETAILED DESCRIPTION OF THE INVENTION

Figure 1A:
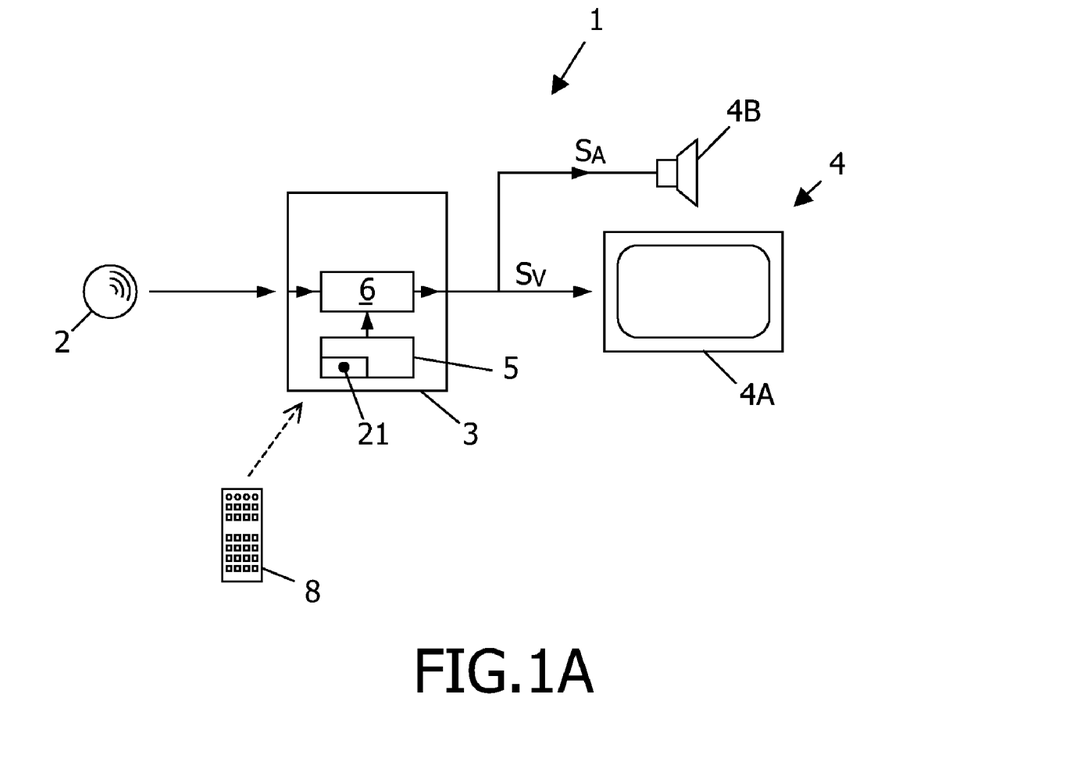
FIG. 1A is a block diagram schematically illustrating a reproduction system.

FIG. 1A schematically shows a reproduction system 1, for reproducing a movie stored on a storage medium 2. In the following explanation, it will be assumed that the storage medium is an optical disc, but the present invention can also be practiced with different types of storage medium. Since optical discs are known per se, it is not necessary here to explain in great detail how information can be stored on and read from an optical disc.

In a particular example, the optical disc may be a BluRay Disc, especially a disc according to the BD-J format (or BD-J specification).

The reproduction system 1 comprises a storage medium reader 3, in this example an optical disc drive, for reading information from the disc 2 and for generating a video output signal SV for an image display device 4A, for instance a monitor or a television screen or the like, of a display apparatus 4. It is noted that a movie also comprises audio, so the drive 3 will also generate an audio output signal SA for one or more loudspeakers 4B of the display apparatus 4.

Figure 1B:
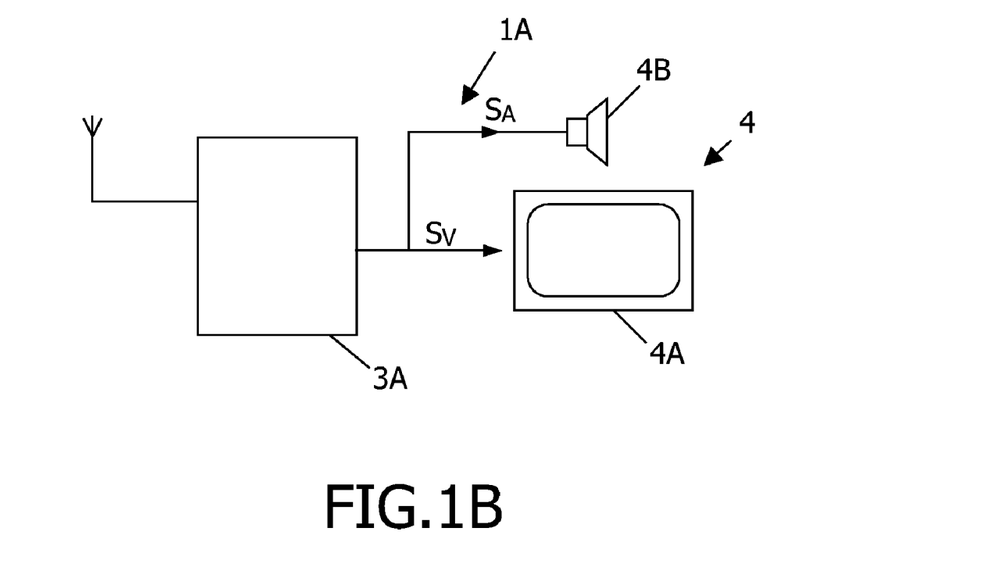
FIG. 1B is a block diagram schematically illustrating another type of reproduction system.

FIG. 1B illustrates an alternative reproduction system 1, where the disc drive 3 is replaced by a receiver 3A, suitable for receiving a transmission signal carrying the data representing a video stream. The transmission signal may be a signal travelling through air, picked up by an antenna, as illustrated, but the transmission signal may also travel by cable or another type of conductor. In the following, however, the explanation will refer to FIG. 1A.

The disc drive 3 comprises a data processing device 6, typically implemented, at least partially, in software. This data processing device 6 receives and processes the incoming data read from disc to generate the display signals SV, SA.

In the following, the word "title" will be used to indicate a full video stream, i.e. a data stream normally resulting in a full-screen display. The word "movie" will be used to indicate a sequence of consecutive pictures regarding the same scene, and the corresponding sound. If a picture is displayed at full screen, a "title" involves one "movie". However, in the case of mosaic display, wherein multiple pictures are displayed as tiles of a mosaic, a title involves multiple movies. A movie generally contains video as well as audio. A movie may be a film, a documentary, an advertisement, etc.

Figure 2:
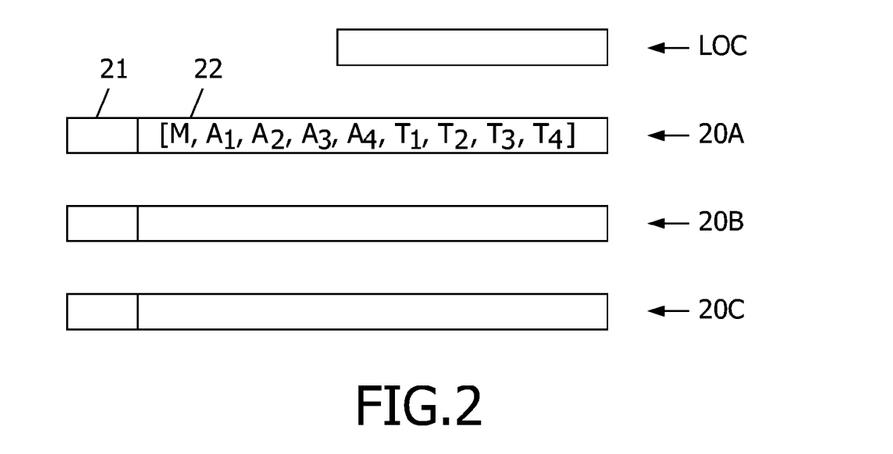
FIG. 2 is a diagram schematically illustrating the storage of movies on a disc.

The disc 2 may contain more than one title 20. FIG. 2 illustrates three different titles 20, distinguished from each other by the addition of characters A, B, C. The disc 2 may further contain a list of contents LOC, also indicated in FIG. 2. When a user inserts the disc 2 into the disc drive 3, the disc drive 3 will first read the list of contents LOC and show its information on the display 4, allowing the user to choose which title he wishes to see. The user can input his choice using a remote control 8 or other suitable type of input device. For instance, if the reproduction system 1 is implemented as a PC or laptop, the user can input his choice using the keyboard (not shown) of such PC or laptop. Then, the disc drive 3 starts reading the selected title 20.

According to an important feature of the present invention, a title 20 as stored on disc comprises data 22 representing the actual movie pictures (and audio), plus data 21 representing an application software. Typically, each title will have its own application software, but it is also possible that the disc 2 contains only one application common to all titles 20. It is noted that the BD-J standard (or BD-J specification), which is still under development, allows Java applications to be stored on disc, but the invention is not restricted to Java applications: the principles of the present invention can be practiced irrespective of the language of the applications.

The disc drive 3 is designed to determine whether the selected title 20 has application software 21 associated therewith. Thus, in response to receiving the user selection, the disc drive 3 first determines whether the selected title 20 has application software 21 associated therewith.

If the disc drive 3 finds that the selected title 20 has application software 21 associated therewith, it is designed to first read the application software 21 associated with this title 20, to store it into its memory 5, and run it. FIG. 1A schematically illustrates the disc drive 3 having application software 21 stored in its memory 5.

With the application software 21 running, it becomes an integral part of the data processing device 6 of the disc drive 3. It is noted that any disc drive which is BD-J-compliant will run the application 21 as part of its data processing device 6. A disc drive which is not BD-J-compliant will generate its display signals SV, SA on the basis of the data 22 in the usual way, without benefiting from the advantages offered by the application software 21 of the present invention.

It is noted that techniques for coding video and storing such video on the disc, and techniques for reconstructing a video display signal on the basis of data read from the disc, are techniques known per se, so it is not necessary here to explain these techniques in further detail.

Figure 3:
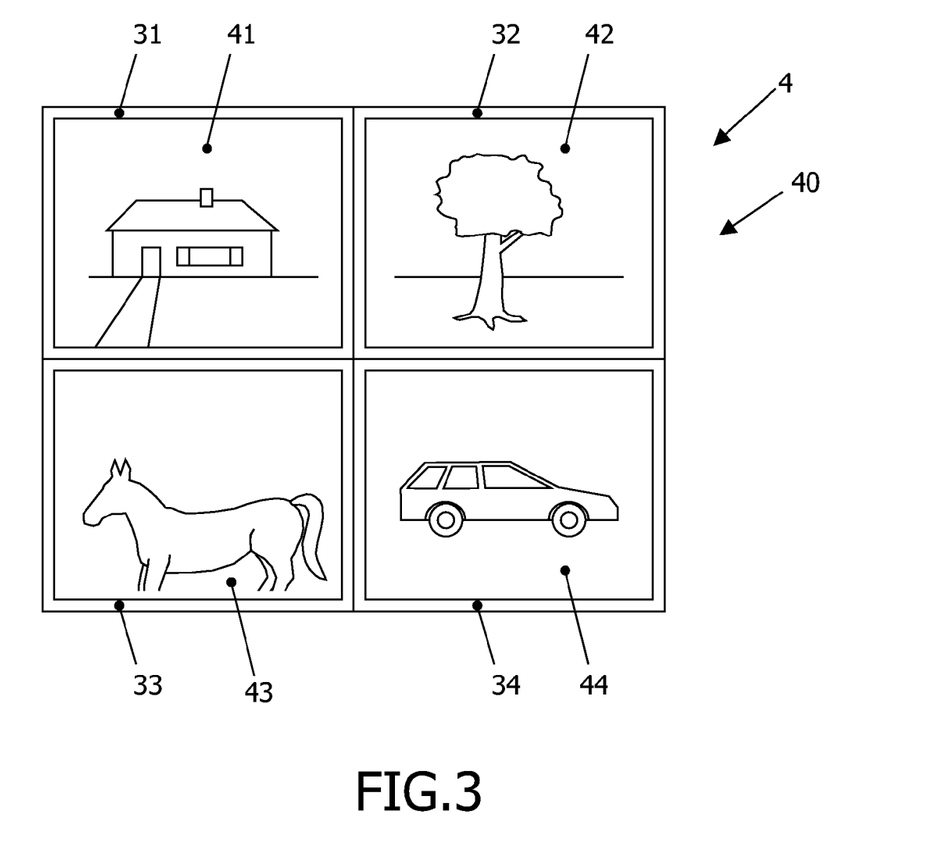
FIG. 3 is a diagram schematically illustrating mosaic display.
Figure 4A:
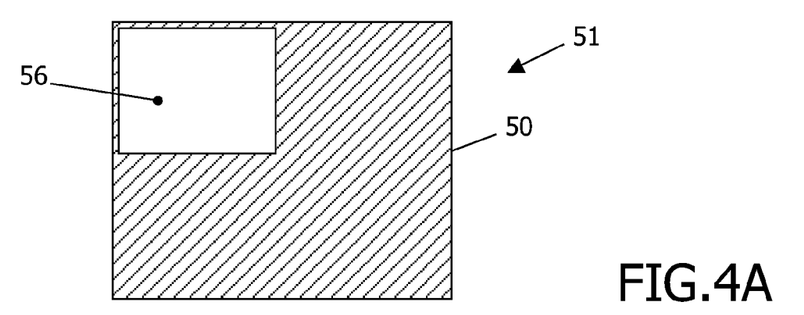
FIGS. 4A-4D are diagrams schematically illustrating different embodiments of a graphics layer.
Figure 4B:
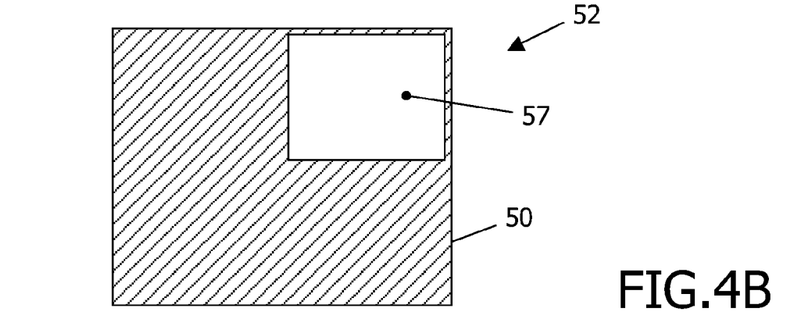
Figure 4C:
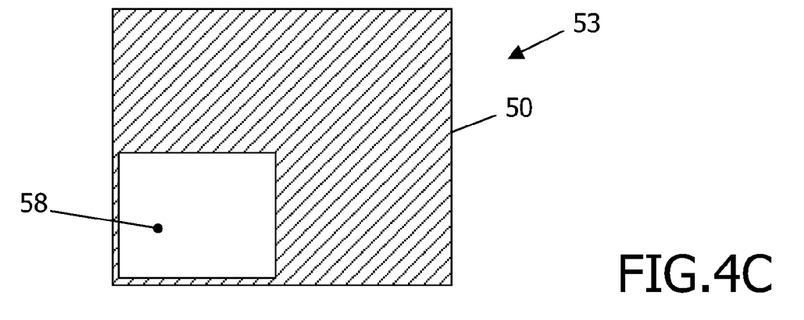
Figure 4D:
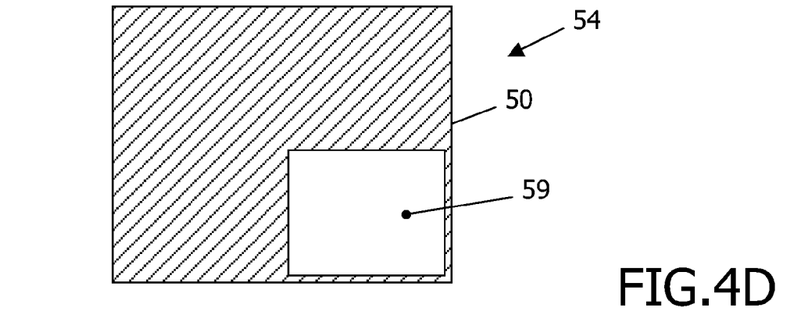

According to an important feature of the present invention, the actual title data 22 contains information of more than one movie, so that, on reproduction, a mosaic display results, where the plurality of movies are displayed simultaneously in different sections of the display screen. This is illustrated schematically in FIG. 3 for a case of a mosaic 40 comprising four individual movies, but the mosaic may comprise two or three movies, or may comprise more than four movies. In FIG. 4, four screen sections are indicated by reference numerals 31, 32, 33, 34, each showing a respective scene of respective movies 41, 42, 43, 44. The display of FIG. 3 would be the display shown by a disc drive without the application software 21 running. It is noted that in FIG. 4 the four screen sections are of equal size, but this is not essential.

According to a further important feature of the present invention, the application software 21 is designed to generate data resulting, on display, in a graphics layer overlaying the video image. The application software 21 has four options (corresponding to the four individual movies comprised in the mosaic 40) for generating its data, as illustrated in FIGS. 4A-4D. In each option, the graphics layer 51, 52, 53, 54 comprises a first rectangle 50 having dimensions corresponding to the full screen size of the display apparatus 4, and a second rectangle 56, 57, 58, 59 having a size and location corresponding to one of said four screen sections 31, 32, 33, 34, respectively. The first rectangle 50 is completely opaque, while the second rectangle 56, 57, 58, 59 is completely, or at least substantially, transparent.

Figure 5A:
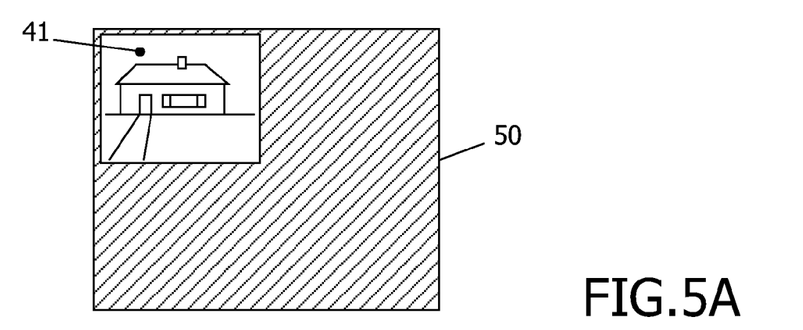
FIGS. 5A-5D are diagrams schematically illustrating a display of a mosaic screen overlaid with a graphics layer.
Figure 5B:
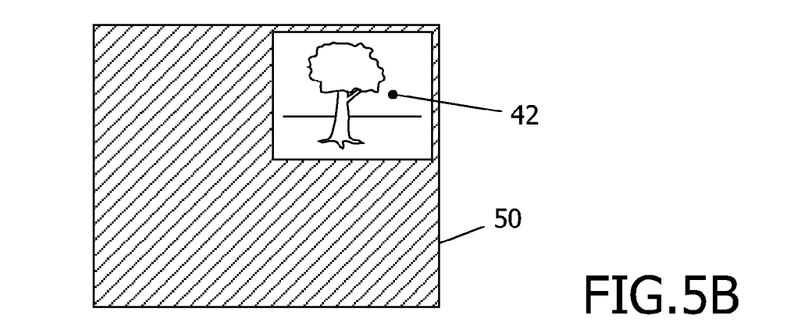
Figure 5C:
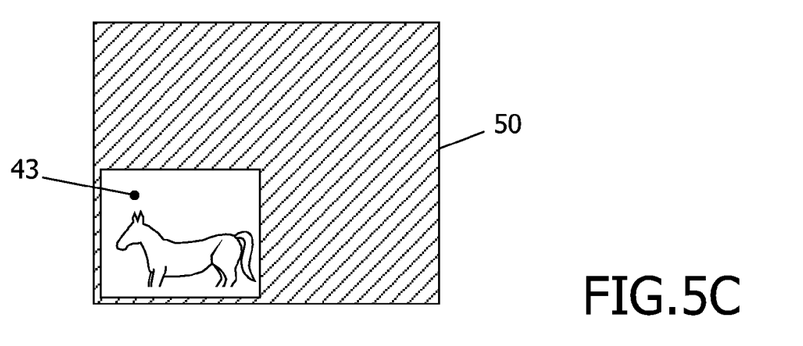
Figure 5D:
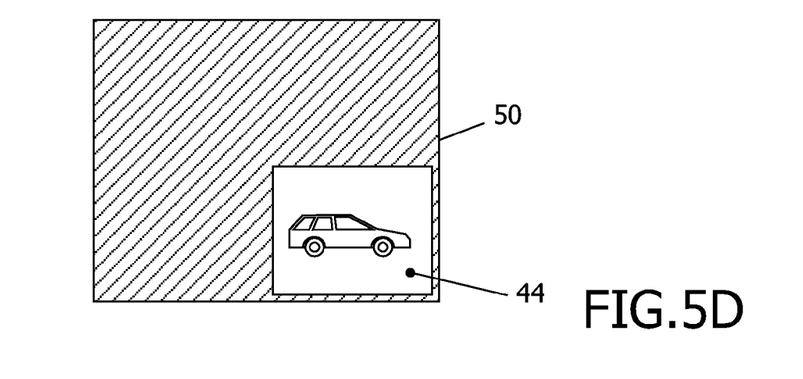

FIGS. 5A-5D illustrate the effect of combining the mosaic 40 of movies 41, 42, 43, 44 with a selected one of the four options for the graphics layer 51, 52, 53, 54. FIG. 5A illustrates that, when the mosaic 40 is combined with the first graphics layer 51, the transparent second rectangle 56 of the first graphics layer 51 is aligned with the first screen section 31 so the first movie scene 41 is visible while the remaining movie scenes 42, 43, 44 are invisible due to the opaque graphics overlay 50. FIG. 5B illustrates that when the mosaic 40 is combined with the second graphics layer 52, the transparent second rectangle 57 of the second graphics layer 52 is aligned with the second screen section 32, so the second movie scene 42 is visible while the remaining movie scenes 41, 43, 44 are invisible due to the opaque graphics overlay 50. FIG. 5C illustrates that when the mosaic 40 is combined with the third graphics layer 53, the transparent third rectangle 58 of the third graphics layer 53 is aligned with the third screen section 33, so the third movie scene 43 is visible while the remaining movie scenes 41, 42, 44 are invisible due to the opaque graphics overlay 50. FIG. 5D illustrates that when the mosaic 40 is combined with the fourth graphics layer 54, the transparent fourth rectangle 58 of the fourth graphics layer 54 is aligned with the fourth screen section 34, so the fourth movie scene 44 is visible while the remaining movie scenes 41, 42, 43 are invisible due to the opaque graphics overlay 50.

The application software 21 is further designed to select one of said four options so that, as a result, only one of said four movie scenes 41, 42, 43, 44 is visible for the user. The application software 21 may be designed to receive a user selection command, for instance from remote control device 8, and to select one of said four options in response to such user selection command. Thus, the user selection command corresponds, for the user, to selecting one of said movies for display.

It is noted that the data 22 stored on disc relates to one video stream resulting in a display of a mosaic, indicated by character M in FIG. 2, so the data as read from disc still contain all four movies, and the data processing still results in the generation of a video mosaic 40, but the graphics signal generated by the application software 21 suppresses part of the video output signal, or, worded differently, the graphics layer overlaying the video layer hides part of the video from view, so that only one scene of the mosaic remains visible.

Thus, the present invention makes it possible to allow a user a selection of movies without increasing the bandwidth: the bandwidth required for transmitting the video mosaic 40 corresponds to the bandwidth required for one video stream. Also, the storage space required for storing the video mosaic data 22 on disc 2 corresponds to the storage space required for one video stream.

In the FIGS. 3 and 5A-D, the scenes as illustrated are totally different, corresponding to four totally different movies. Of course, the audio associated with these four totally different movies will be different from each other. Therefore, the title data 22 as stored on disc 2 will comprise data for four different audio signals, always associated with one of said movies. This is illustrated by four characters A1, A2, A3, A4 in FIG. 2. In this case, when reading disc 2, the disc drive 3 will receive all audio data A1, A2, A3, A4, and the application software 21 is further designed to select one of said four audio signals A1, A2, A3, A4, on the basis of the user selection command. For instance, if the application software 21 selects the first graphics layer 51, it also selects the corresponding first audio signal A1, so that the first movie scene 41 is visible and the corresponding first audio A1 is presented.

Alternatively, it is possible that the four scenes are actually views from different angles of the same action, in which case the audio signal may be the same for all user selections, so the title data 22 need not contain more than one audio signal common to all movies.

In the example of the FIGS. 5A-D, a large portion of the screen is not showing a movie. In a preferred embodiment, the application software 21 is further designed to generate text and/or graphics images in a portion of the first rectangle 50 outside the second rectangle 56, 57, 58, 59. For instance, such text can convey information regarding the subject of the scene being watched. Such text may be static or changing text generated by the application software 21 independently of the actual movie, but it is also possible that the text to be shown is incorporated in the data 22 stored on disc 2. Again, different movies or even different angles may have different texts associated therewith; this is illustrated by four characters T1, T2, T3, T4 in FIG. 2. In this case, when reading disc 2, the disc drive 3 will receive all text data T1, T2, T3, T4, and the application software 21 is further designed to select one of said four text data T1, T2, T3, T4, on the basis of the user selection command. For instance, if the application software 21 selects the first graphics layer 51, it also selects the corresponding first text signal T1, so that the first movie scene 41 is visible and the corresponding first text T1 is shown somewhere on the first rectangle 50 outside the second rectangle 56.

It should be clear to a person skilled in the art that the addition of multiple audio data A1, A2, A3, A4 and the addition of multiple text data T1, T2, T3, T4 requires just a relatively small increase in bandwidth as compared to adding multiple full-size video data.

In the above example, the application software 21 is designed to only generate a graphics layer. The video information as such is not changed: each scene of the mosaic 40 is displayed on a portion of the display screen, the portion of the screen having a location corresponding to the scene's location in the mosaic. As an alternative, it is also possible that the application software 21 is designed to manipulate the video information such that the selected scene is displayed at a different location and/or at a different size. This will be illustrated with reference to FIGS. 6A and 6B.

Figure 6A:
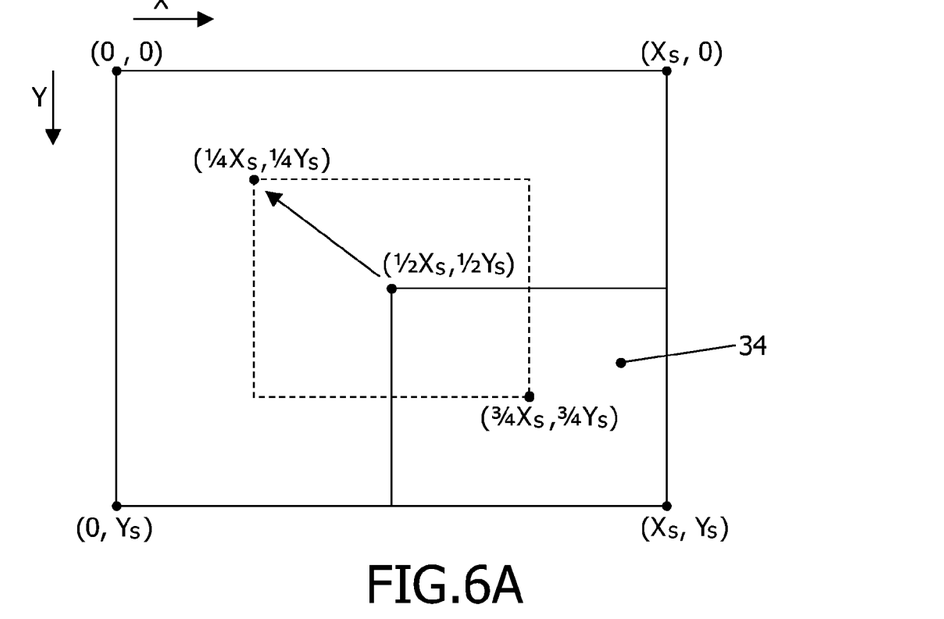
FIG. 6A is a diagram schematically illustrating shifting a screen portion to the center of the screen.

In FIG. 6A, a pixel on the display screen of the display apparatus 4 is characterized by coordinates $(X, Y)$, X representing a horizontal coordinate and Y representing a vertical coordinate, wherein the upper left-hand corner of the screen has coordinate $(0, 0)$. The lower right-hand corner of the screen is defined by coordinates $(Xs, Ys)$. The center of the screen is defined by coordinates $(Xs/2, Ys/2)$. The fourth screen portion 34 is defined by coordinates $(Xs/2, Ys/2)$ for its upper left-hand corner and $(Xs, Ys)$ for its lower right-hand corner. In the video mosaic, pixels having coordinates $(Xp, Yp)$ for which the following condition applies:

$$Xs/2 \leq Xp \leq Xs \text{ and } Ys/2 \leq Yp \leq Ys \quad (1)$$

belong to the fourth movie.

Suppose it is desired to view the fourth movie displayed in a central screen portion, defined by coordinates $(Xs/4, Ys/4)$ for its upper left-hand corner and $(3 \cdot Xs/4, 3 \cdot Ys/4)$ for its lower right-hand corner.

The application software 21 can achieve this effect by shifting each pixel over a distance $-Xs/4$ in the horizontal direction $-Ys/4$ in the vertical direction. Or, for the pixels for which the following condition holds:

$$Xs/4 \leq Xp \leq 3 \cdot Xs/4 \text{ and } Ys/4 \leq Yp \leq 3 \cdot Ys/4 \quad (2)$$

new pixel data $D_N(Xp, Yp)$ are calculated on the basis of original pixel data $D_o(Xp, Yp)$ according to the following formula:

$$D_N(Xp, Yp) = D_o(Xp + Xs/4, Yp + Ys/4) \quad (3)$$

wherein $D_o$ and $D_N$ represent relevant pixel data such as color and brightness.

Figure 6B:
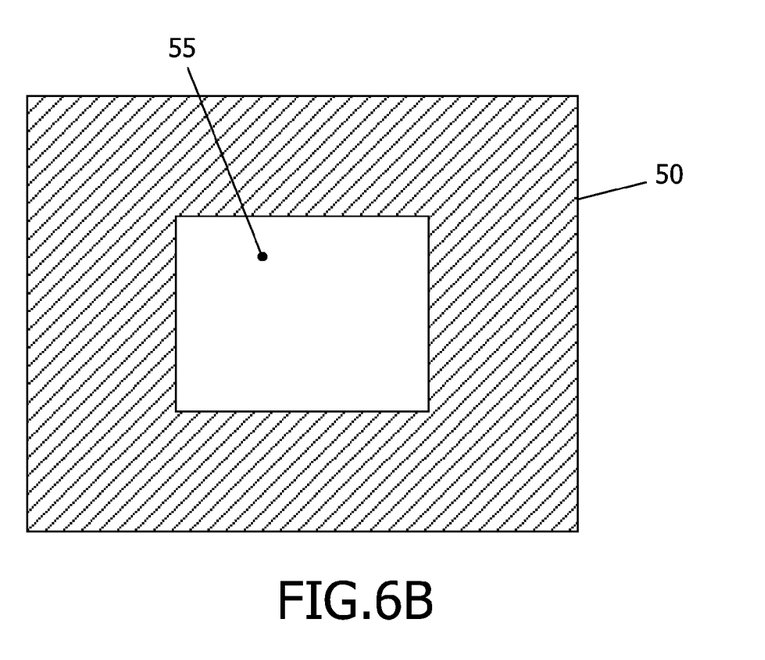
FIG. 6B is a diagram schematically illustrating a display of a this central screen portion overlaid with a graphics layer.

For the pixels outside the central screen portion, it is not necessary to define new pixel data, as the application software 21 is, in this example, further designed to generate the first graphics rectangle 50 and the second graphics rectangle 55, now aligned with the central screen portion (FIG. 6B).

It should be clear to a person skilled in the art how new pixel data are to be calculated if it is desired to view any of the first to third movies displayed in the central screen portion.

In the above example, the size of the central screen portion corresponds to the original size of a mosaic tile, which, in the case where a mosaic has four tiles of equal size, corresponds to one quarter of the screen size. It may occur that the user desires display on an increased size, or even full-screen display. In the latter case, the application software 21 can easily achieve this effect by displacing each pixel to a new position, according to the following steps. After having calculated new pixel data according to formula (3) above, the application software 21 calculates, for each pixel $(Xp, Yp)$ for which condition (2) applies, the X-distance XDp and the Y-distance YDp from the screen center (Xs/2, Ys/2), according to the following formula:

$$XDp = Xs/2 - Xp;\ YDp = Ys/2 - Yp \qquad (4)$$

Further, the application software 21 calculates a new pixel $(X_N, Y_N)$ having the X-distance $XD_N$ and the Y-distance $YD_N$ from the screen center (Xs/2, Ys/2) twice as large as XDp and YDp, respectively, thus:

$$XD_N = Xs/2 - X_N = 2 \cdot (Xs/2 - Xp) \qquad (5a)$$

$$YD_N = Ys/2 - Y_N = 2 \cdot (Ys/2 - Yp) \qquad (5b)$$

or $$X_N = 2Xp - Xs/2 \text{ and } Y_N = 2Yp - Ys/2 \qquad (6)$$

For this new pixel $(X_N, Y_N)$, new pixel data $D_N'(X_N, Y_N)$ are calculated on the basis of the pixel data $D_N(X_P, Y_P)$ of pixel (Xp, Yp) according to the formula $D_N'(X_N, Y_N) = D_N(X_P, Y_P)$.

For the pixels in between said new pixels $(X_N, Y_N)$, new pixel data need to be calculated on the basis of the new pixel data $D_N'(X_N, Y_N)$ of said new pixels $(X_N, Y_N)$. This can simply be done by allocating the new pixel data $D_N'(X_N, Y_N)$ to each pixel of a square of two by two pixels, but it is also possible to calculate new pixel data by interpolation, as should be clear to a person skilled in the art.

It is true that the above procedure leads to a decrease of image resolution to a certain degree, which may be found acceptable. Alternatively, in for instance an MPEG stream, it is also possible that the title data 22 contain more detail, so that it is possible to increase the image size so as to result in normal resolution.

It is noted that in the case of full-screen display, the application software 21 does not need to generate any graphics layer any more.

Figure 7A:
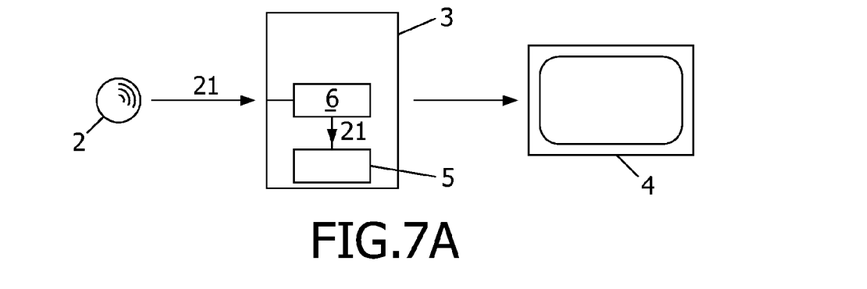
FIGS. 7A and 7B are block diagrams schematically illustrating the operation of a disc drive in accordance with the present invention.
Figure 7B:
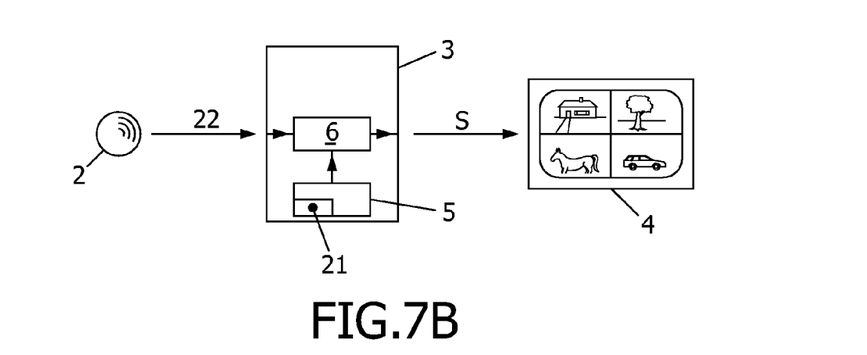

The use of the present invention will now be described with reference to FIGS. 7A-7C, wherein FIGS. 7A and 7B are schematic diagrams comparable to FIG. 1, and wherein FIG. 7C contains a timeline illustration of a movie 20 stored on a disc 2. After receiving a user command indicating that the user wishes to see a certain title 20, the disc drive starts reading the title 20 from disc. First, the disc drive 3 receives the application 21, which is stored in the memory 5, as illustrated in FIG. 7A. Then, the disc drive 3 receives the data relating to the actual title 22, which is processed by processing device 6 under the control of the application 21, as illustrated in FIG. 7B, to generate an output signal S for the display device 4.

It is not necessary that the title involves mosaic display during its entire length. In an advantageous embodiment, the title involves normal play alternated with mosaic display, as illustrated in FIG. 7C. FIG. 7C shows that the title may involve a normal full-screen display till time t1, illustrated by the single solid horizontal line "normal" from time t0 to time t1. At time t1, the video display changes to a mosaic display of, in this example, four different scenes, illustrated by the four solid horizontal lines marked V1, V2, V3, V4 from time t1 to time t5. These four different scenes may be multi-angle views of one and the same action, but it may also be that the normal program is interrupted by an interactive commercial.

The application 21 associated with this movie will know that mosaic display has started at time t1. In one possible embodiment, the video signal may comprise a coded trigger signal, which is received by the application 21 and understood as indicating the start of mosaic display. In another possible embodiment, the application 21 may be associated with a table of time codes, indicating which images are "normal" display and which images are mosaic display. An advantage of this second embodiment is that it can easily be combined with reverse play.

In any case, from time t1 the application 21 will be ready to generate one of the options of graphics layer 51, 52, 53, 54, as illustrated by the four horizontal dotted lines marked G1, G2, G3, G4 from time t1 to time t5. It may be that the application 21 starts generating a graphics layer immediately at time t1, but it is also possible, as illustrated, that the application 21 starts without generating a graphics layer until the user sends a command, in which case, from time t1, the user is presented with a mosaic, as illustrated in FIG. 7B.

At time t2, the user sends a command, indicating that he wishes to see only the first scene of the mosaic. In response, the application 21 generates the first option of the graphics layer 51, comprising the second rectangle 56 corresponding to the first screen section 31, as indicated by the solid horizontal line G1 from time t2 to time t3. The second, third and fourth scenes of the mosaic are now hidden from view, as illustrated in FIG. 5A.

At time t3, the user changes his choice and sends a new command, indicating that he wishes to see only the second scene of the mosaic. In response, the application 21 generates the second option of the graphics layer 52, comprising the second rectangle 57 corresponding to the second screen section 32, as indicated by the solid horizontal line G2 from time t3 to time t4.

According to an important feature of the present invention, the transition from the first choice to the second choice can be instantaneous, from one frame to the next, although it is possible for the application 21 to make this transition with some kind of fade-in and fade-out effect. Synchronization between the "previous" scene and the "next" scene is automatic, since both scenes are part of the same mosaic.

Figure 7C:
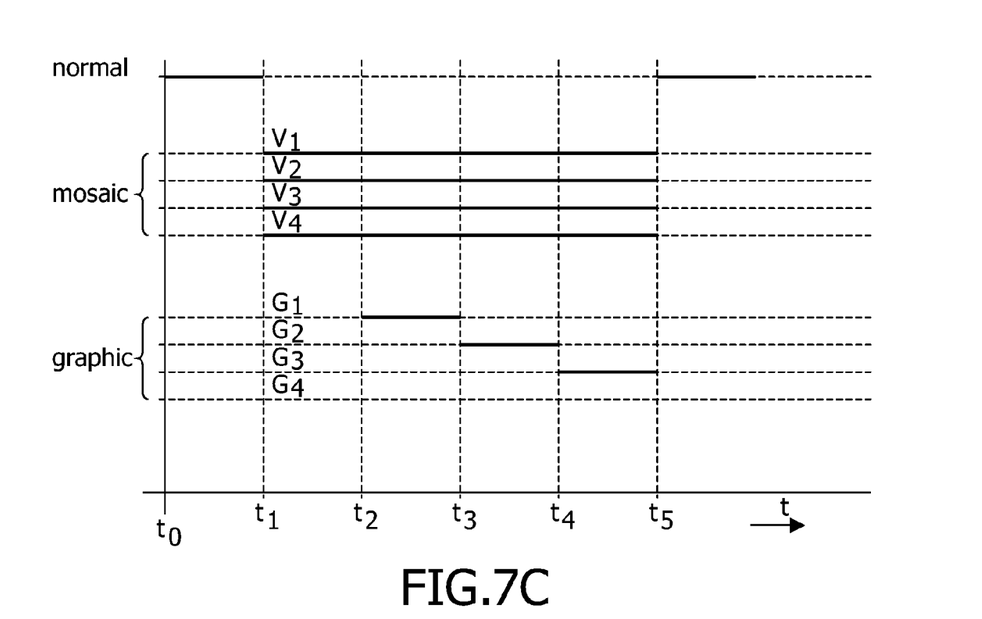
FIG. 7C is a graph containing a time line schematically illustrating the operation of a disc drive in accordance with the present invention.

FIG. 7C illustrates that the user can change his choice many times (t4), until at time t5 normal full-screen display is resumed.

It is important to realize that the mosaic display and the user's choices do not affect the disc reading operation of the disc drive 3. At all times from t0 to t5, the disc drive is just reading and displaying one and the same title. Only the title-related application 21 running in the disc drive responds to the user commands by changing a graphics layer, and possibly changing the processing of the title.

It should be clear to a person skilled in the art that the present invention is not limited to the exemplary embodiments discussed above, but that several variations and modifications are possible within the protective scope of the invention as defined in the appended claims.

In the above, the invention was described for an exemplary case where the choice of which scene from the mosaic to watch was left to the user. In such case, it is the application that effects the change from one scene selection to the next, but the application does this in response to a user command. Alternatively, it is also possible that the application is designed to effect such change without the user having any influence. For instance, the disc drive may have a memory for user characteristics, and the application may be designed to determine a choice of which scene to display on the basis of such user characteristics. Or, the application may be designed to ask the user to input some user characteristics, and to determine a choice of which scene to display on the basis of such user characteristics. Examples of suitable user characteristics are: male/female, age, favorite sport.

It is also possible that the video stream contains trigger signals for the application, causing the application to select a "next" picture. Thus, it is possible that the same video stream is played multiple times, each time resulting in different pictures being displayed (for instance different advertisements).

Further, in the above, the invention was described for an exemplary case where the application is self-starting, i.e. is automatically run when loaded into the disc drive's operational memory. However, this self-starting property is not essential. It is possible that the application is only started upon receipt of a user-command. Then, it is up to the user to decide whether or not he wishes to benefit from the advantages offered by the application. It may even be that starting the advantageous application is made subject to fulfilling a condition, for instance making a payment.

In the above, with reference to FIG. 7, an example is described where video display is changed from full screen display to mosaic display and back. It is also possible that a title comprises a temporal portion with mosaic display with a first number of scenes, for instance four scenes, and a subsequent temporal portion with mosaic display with a second number of scenes, for instance two scenes. Thus, a transition may be made from a first number of scenes to a second number of scenes, the second number differing from the first number. One of these numbers may be equal to one. It is also possible that a title comprises a temporal portion with mosaic display with a first number of scenes, for instance two scenes, and a subsequent temporal portion with mosaic display with the same number of scenes but displayed on different screen portions. For instance, in the case of two scenes, screen portions may correspond to the upper and lower halves of the screen, or screen portions may correspond to the left and right halves of the screen. In all of these cases, the application will know when the transition from a first type of mosaic to a second type of mosaic takes place, and will adapt the graphics layer accordingly. In all of these cases, the application may receive its information as to the timing of such transitions from a trigger signal contained in the video data or from timing data contained in a memory.

In the above, the present invention has been explained with reference to block diagrams, which illustrate functional blocks of the device according to the present invention. It is to be understood that one or more of these functional blocks may be implemented in hardware, where the function of such functional block is performed by individual hardware components, but it is also possible that one or more of these functional blocks are implemented in software, so that the function of such functional block is performed by one or more program lines of a computer program or a programmable device such as a microprocessor, microcontroller, digital signal processor, etc.

The invention claimed is:

1. Non-transitory machine readable medium containing at least one title comprising a collection of mosaic video data which, on reading and suitable processing by a medium reader device, result in the medium reader device generating a video output signal (SV) for an image display device (4A), the video output signal (SV), on display, resulting in a mosaic of multiple scenes in different sections of the display screen;
wherein the at least one title further contains data associated with the said mosaic video data, the associated data representing a machine-executable application;
wherein the application contains machine-executable instructions for the medium reader device causing the medium reader device to automatically generate a graphics component of said video output signal resulting, on display, in a graphics layer overlying said mosaic of multiple scenes;
wherein said graphics layer comprises a first graphics portion which is at least partly transparent and which is aligned with one of said different sections of the display screen;
and wherein said graphics layer comprises a second graphics portion which is fully opaque and which is aligned with all other sections of the display screen
wherein said application is capable of setting the location of the said first portion of said graphics layer in response to receiving a user command, and
wherein said application includes a table of time codes indicating which images are displayed with said graphics layer overlying the mosaic of multiple scenes and which images are displayed as a normal display.

2. Medium according to claim 1, wherein the said medium (2) is an optical disc, according to the BD-J-format, and wherein the said medium reader device (3) comprises a disc drive.

3. Medium according to claim 1, wherein the machine-executable application is common to at least two titles.

4. Medium according to claim 1, wherein different titles comprise separate applications.

5. Medium according to claim 1, wherein the application is self-starting.

6. Medium according to claim 1, wherein the said second portion of said graphics layer also comprises text matter relating to the scene being displayed in the screen section aligned with the said first portion of said graphics layer.

7. Medium according to claim 1, wherein the said application is capable of setting the location of the said first portion of said graphics layer so as to become coincident with another one of said screen sections.

8. Medium according to claim 7, wherein said application is capable of setting the location of the said first portion of said graphics layer in response to receiving a trigger signal contained in said mosaic video data.

9. Medium according to claim 7, wherein said application is capable of setting the location of the said first portion of said graphics layer on the basis of data representing a user-profile.

10. Medium according to claim 7, wherein said title comprises a first portion of video data resulting in a first type of mosaic, and a subsequent portion of video data resulting in a second type of mosaic, the second type of mosaic being different from the first type of mosaic;
and wherein the application is designed to adapt the graphics layer accordingly, synchronized with the transition from first type of mosaic to second type of mosaic.

11. Medium according to claim 1, wherein the said title comprises a first portion of video data resulting in a mosaic of a first number of scenes, and a subsequent portion of video data resulting in a mosaic of a second number of scenes, the second number being different from the first number.

12. Medium according to claim 1, wherein said title comprises a first portion of video data resulting in a mosaic of a number of scenes displayed in a first collection of screen sections, and a subsequent portion of video data resulting in a mosaic of the same number of scenes displayed in a second collection of screen sections different from the screen sections of the first collection.

13. Medium according to claim 1, wherein said title further comprises audio data common for the multiple scenes.

14. Medium according to claim 1, wherein said title further comprises multiple audio data (A1, A2, A3, A4) each corresponding to one of the said multiple scenes;
and wherein the said application contains instructions for the medium reader device (3, 3A) causing the medium reader device to generate an audio output signal (SA) on the basis of one of said multiple audio data (A1, A2, A3, A4) as corresponding to the pictures visible through the transparent first graphics portion.

15. Medium according to claim 1, wherein said title further comprises multiple text data (T1, T2, T3, T4) each corresponding to one of the said multiple scenes;

and wherein the said application contains instructions for the medium reader device causing the medium reader device to generate a text signal on the basis of one of said multiple text data (T1, T2, T3, T4) as corresponding to the scenes visible through the transparent first graphics portion, the text being displayed over the opaque second graphics portion.

16. A computer program product in one or more non-transitory computer-readable storage media, comprising machine-executable instructions that, when executed by a computer, causes the computer to perform actions of:

automatically generate a component of a video output signal (SV) for an image display device (4A), the signal resulting, on display, in a graphics layer overlying a video picture produced by said video output signal;

wherein said graphics layer comprises a first portion which is at least partly transparent and which is aligned with a first section of the image display device;

and wherein said graphics layer comprises a second portion which is fully opaque and which is aligned with all other sections of the image display device setting the location of the said first portion of said graphics layer in response to receiving a user command, and wherein said application includes a table of time codes indicating which images are displayed with said graphics layer overlying the mosaic of multiple scenes and which images are displayed as a normal display.

17. Computer Program Product according to claim 16, wherein said second portion of said graphics layer also comprises text matter relating to the scene being displayed in the screen section aligned with the said first portion of said graphics layer.

18. Computer Program Product according to claim 16, wherein said application is capable of setting the location of the said first portion of said graphics layer so as to become coincident with another one of said screen sections.

19. Computer Program Product according to claim 18, wherein said application is capable of setting the location of the said first portion of said graphics layer in response to receiving a user command.

20. Computer Program Product according to claim 18, wherein the said application is capable of setting the location of the said first portion of said graphics layer in response to receiving a trigger signal contained in video data which is received by said medium reader device.

21. Computer Program Product according to claim 18, wherein said application is capable of setting the location of the said first portion of said graphics layer on the basis of data representing a user-profile.

22. Computer Program Product according to claim 18, wherein the application is designed to adapt the graphics layer in accordance with and in synchronization with changes in video data which is received by said medium reader device.

23. Computer Program Product according to claim 18, wherein the application is designed to change the display location of one of said scenes, and to change the location of the said first portion of said graphics layer accordingly so as to become aligned with the new display location of said one of said scenes.

24. Computer Program Product according to claim 18, wherein the application is designed to change the display size of one of said scenes, and change the size of the said first portion of said graphics layer accordingly.

25. Disc drive having an operational memory for storing data processing software therein, the operational memory containing the computer program product according to claim 16.

26. Method for generating a video display on a screen (4A), the method comprising the steps of:

automatically generating a video output signal (SV) for the display screen, the signal, on display, resulting in a mosaic of multiple scenes in different sections of the display screen;

generating a graphics output signal for the display screen, the graphics signal, on display, resulting in a graphics layer comprising a first graphics portion which is at least partly transparent and which is aligned with one of said sections of the display screen, the graphics layer further comprising a second portion which is fully opaque and which is aligned with all other sections of the display screen;

combining said graphics output signal with said video output signal such that the said graphics layer is overlying said mosaic of multiple scenes setting the location of the said first graphics portion of said graphics layer in response to receiving a user command wherein said application includes a table of time codes indicating which images are displayed with said graphics layer overlying the mosaic of multiple scenes and which images are displayed as a normal display.

27. Method according to claim 26, the method further comprising the steps of selecting one of said multiple scenes, and setting the first graphics portion such that its location is aligned with the display screen section corresponding to the selected one of said multiple scenes.

28. Method according to claim 26, the method further comprising the steps of:

generating multiple audio data each corresponding to a respective one of said multiple scenes;

selecting one of said multiple scenes;

selecting a corresponding one of said multiple audio data; and generating an audio signal (SA) for sound display on the basis of said selected one of said multiple audio data.

* * * * *